US006710334B1

(12) United States Patent
Twerenbold

(10) Patent No.: US 6,710,334 B1

(45) Date of Patent: Mar. 23, 2004

(54) QUADRUPOL ION TRAP MASS SPECTROMETER WITH CRYOGENIC PARTICLE DETECTOR

(75) Inventor: Damian Twerenbold, Boudry (CH)

(73) Assignee: GenSpec SA, Boudry (CH)

(*) Notice: Subject to any disclaimer, the term of this patent is extended or adjusted under 35 U.S.C. 154(b) by 0 days.

(21) Appl. No.: 10/347,988

(22) Filed: Jan. 20, 2003

(51) Int. Cl.[7] ........................... B01D 59/44; H01J 49/40

(52) U.S. Cl. ........................ 250/286; 250/292; 250/288

(58) Field of Search ................................ 250/282, 286, 250/288, 299, 292

(56) References Cited

U.S. PATENT DOCUMENTS

| | | | |
|---|---|---|---|
| 2,939,952 | A | 6/1960 | Paul et al. |
| 4,540,884 | A | 9/1985 | Stafford et al. |
| 5,075,547 | A | 12/1991 | Johnson et al. |
| 5,170,054 | A | 12/1992 | Franzen et al. |
| 5,640,010 | A | 6/1997 | Twerenbold |
| 5,994,694 | A | 11/1999 | Frank et al. |

OTHER PUBLICATIONS

Schneider et al. "Confinement in a cryogenic penning trap of highest charge state ions from EBIT" Review of Scientific Instruments vol. 65(11) pp. 3472–3478, Nov. 1994.*

Benner, W.H., et al., J. Am. Soc. Mass. Spectrom., 8 (1997), 1094.

Frank, M., et al., Rapid Comm. in Mass Spectrom., 10 (1996), 1946.

Hilton, G.H., et al., Nature, 391, (1998) 672.

Irwin, K., Appl. Phys. Lett., 66 (1995) 1998.

Linhard, J., et al., Phys.Rev. 124 (1961) 128.

March, R. E., "Quadrupole Ion Trap Mass Spectrometer" in Encyclopedia of Analytical Chemistry, R.A.Meyers (Ed.), pp 11848–11872, John Wiley & Sons Ltd., Chichesterm 2000.

Nahum, M., et al., Appl.Phys.Lett., 66 (1995) 3203.

Schlunegger, U. P. et al., Rapid Commun. Mass Spectrom. 13 (1999) 1792–1796.

Twerenbold, D., Rep. Progr. Phys., 59 (1996) 349.

Twerenbold, D., Nucl.Instr.and.Meth., A370 (1996) 253.

Twerenbold, D., et al., Appl. Phys. Lett., 68 (1996) 3503.

Twerenbold, D., et al., Proteomics, 1 (2001), 66.

Twerenbold, D., et al., Proteomucs, 2 (2002), 436.

Young, B.A., et al., Nucl.Instr.and.Meth., A311 (1992) 195.

* cited by examiner

*Primary Examiner*—John R. Lee
*Assistant Examiner*—Erin-Michael Gill
(74) *Attorney, Agent, or Firm*—Reising, Ethington, Barnes, Kisselle, P.C.

(57) ABSTRACT

This invention relates to a quadrupol ion trap mass spectrometer with improved sensitivity for massive molecules by using cryogenic particle detectors as molecule detectors. Cryogenic particle detectors have a mass independent detection efficiency and do not show a decrease of detection efficiency for increasing molecule mass as compared to ionizing detectors which are used in common quadrupol ion trap mass spectrometers.

61 Claims, 6 Drawing Sheets

QUADRUPOL ION TRAP MASS SPECTROMETER WITH CRYOGENIC PARTICLE DETECTOR

BACKGROUND OF THE INVENTION

This invention relates to a quadrupol ion trap mass spectrometer for molecules.

In prior art quadrupol ion trap mass spectrometers, molecules are injected into an evacuated receptacle in which a ring electrode and two endcap electrodes are configurated and operated in such a manner that molecules with masses larger than a particular cut off mass are trapped. The configuration for generating the required dynamic three dimensional electric quadrupol field has first been described by Paul et al in U.S. Pat. No. 2,939,952. When increasing the RF amplitude on the ring electrode, the lower cut mass increases, and molecules with increasing mass are ejected from the quadrupol ion trap mass spectrometer, and after acceleration, detected with a molecule detector. This mass scanning mode of a quadrupol ion trap and its application for mass spectrometry has been described by Stafford et al in U.S. Pat. No. 4,450,884, Johnson et al in U.S. Pat. No. 5,075,547 and Franzen et al. in U.S. Pat. No. 5,170,054. Prior art quadrupol ion trap mass spectrometers are now commercially available from ThermoFinnigan (San Jose, USA) and Bruker Daltonics (Hamburg, Germany). The principles of a quadrupol ion trap mass spectrometer and its applications are described in reference [Mar00]. Schlunegger et al. have demonstrated that large molecules with masses beyond 100 kDa can be analyzed with quadrupol ion trap mass spectrometers [Sch99].

In prior art quadrupol ion trap mass spectrometers the molecule detector determining the time of ejection of the molecule is an ionizing detector. The disadvantage of ionizing detectors is the strong decrease of detection efficiency for molecules with decreasing velocity [Lin61]. Molecules ejected from a quadrupol ion trap mass spectrometer are accelerated prior to hitting the detector. All molecules have the same acceleration energy and hence molecules with increasing masses have a decreasing velocity. Prior art quadrupol ion trap mass spectrometer using ionizing detectors therefore have a decreasing sensitivity for increasing molecule mass.

It is the objective of this invention to improve the sensitivity of quadrupol ion trap mass spectrometers for massive molecules by using cryogenic particle detectors as molecule detectors.

Cryogenic particle detectors as detectors for molecules in mass spectrometers are described by Twerenbold in U.S. Pat. No. 5,640,010 and a particular embodiment of a cryogenic particle detector for mass spectrometry is described by Frank et al in U.S. Pat. No. 5,994,694. Cryogenic particle detectors have been successfully used as molecule detectors in matrix assisted laser desorption/ionization time-of-flight mass spectrometers (see references [Twe96b], [Twe96c], [Fra96], [Ben 97], [Hil98], [Twe01] and [Twe02]). The mass independent detection efficiency of cryogenic particle detectors and the increased detection sensitivity for massive molecules has been demonstrated [Twe01].

SUMMARY OF THE INVENTION

This invention is a quadrupol ion trap mass spectrometer comprising an apparatus for volatilizing and charging molecules out of a mixture; an electro-optical injection apparatus in which the volatilized and charge molecules are accelerated and injected into an evacuated quadrupole ion trap receptacle; the evacuated quadrupole ion trap receptacle containing a ring electrode, an upper end cap electrode and a lower end cap electrode; the three electrodes placed such in the evacuated quadrupole ion trap receptacle that they create an electric quadrupole field in the central region of the evacuated quadrupole ion trap receptacle; the upper end cap electrode having a hole for permitting the entry of the accelerated molecules produced in the volatilizing and charging apparatus and injected from the electro-optical injection apparatus; the lower end cap electrode having a hole for permitting the exit of molecules; a radio frequency alternating current voltage supply connected to the ring electrode operated such that the injected molecules are trapped in the evacuated quadrupole ion trap receptacle; a buffer gas introduced into the evacuated quadrupole ion trap receptacle for cooling the trapped molecules; increasing the amplitude of the radio frequency alternating current voltage on the ring electrode such that the trapped molecules are ejected out of the exit hole of the lower end cap electrode in order of increasing mass-to-charge ratio; an apparatus for accelerating and focusing the ejected molecules; a cryogenic particle detector comprising at least one absorber and at least one sensor for determining the time of impact of the molecules ejected from the exit hole of the lower end cap electrode.

Accordingly, it is an object of this invention to provide a novel quadrupol ion trap mass spectrometer for massive molecules with an increased sensitivity for large mass molecules.

It is a still further object of the invention to provide a novel apparatus for measuring the masses of molecules in the single particle counting mode providing the additional information of the energy of the individual molecule.

It is a still further object of the invention to provide a novel apparatus for measuring the charge of the individual molecules.

Those objects are achieved by using cryogenic particle detectors in a quadrupol ion trap mass spectrometer. With a cryogenic particle detector, the absorbed kinetic energy of the impacting accelerated molecules is measured, providing both the arrival time and the energy of the molecule ejected from the quadrupol ion trap mass spectrometer. Because the kinetic energy of the molecules ejected from the quadrupol ion trap mass spectrometer, and subsequently accelerated and focused onto the detector, is independent on the mass of the molecule, a cryogenic particle detector yields a mass independent sensitivity.

In accordance with the above and further objectives of the invention, one embodiment of apparatus is a quadrupol ion trap mass spectrometer with a superconducting tunneling junction as the cryogenic particle detector.

In another embodiment, a quadrupol ion trap mass spectrometer is equipped with a microcalorimeter as the cryogenic particle detector.

In another embodiment, a quadrupol ion trap mass spectrometer is equipped with a superconducting strip detector as the cryogenic particle detector.

From the above summary, it can be understood that the quadrupol ion trap mass spectrometer of this invention has several advantages: (1) it allows the mass determination of a molecule with a sensitivity independent of the mass of the molecule, i.e. there is no decrease in sensitivity for massive molecules; (2) it allows the determination of the energy of an individual molecule ejected from the quadrupol ion trap mass spectrometer; (3) the charged state of this molecule can be determined directly by measuring the pulse height of the cryodetector signal; (4) it allows the reduction of background events of fragmented molecules following the acceleration after ejection from the quadrupol ion trap mass spectrometer.

SUMMARY OF THE DRAWINGS

The above noted and other features of the invention will be understood from the following detailed description when considered with reference to the accompanying drawings in which.

DETAILED DESCRIPTION

Figure 1:
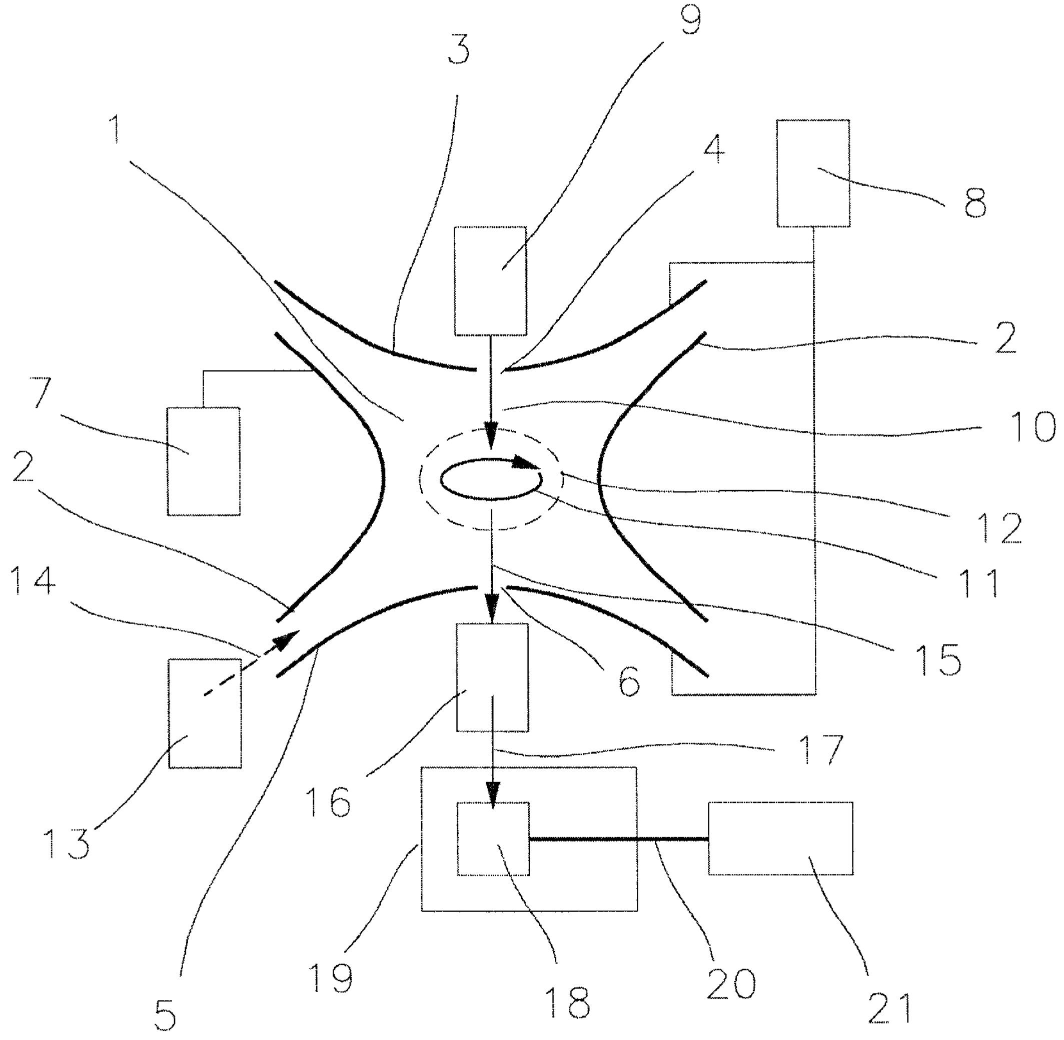
FIG. 1 is a schematic of an embodiment of a quadrupol ion trap mass spectrometer with a cryogenic particle detector.

The following technical terms are defined as follows:

"cryogenic particle detector": a class of single particle detectors which are sensitive to the energy deposition of a single particle (photons, electrons, protons, atoms and molecules) of the order of 1000 electronvolt or less. The detection mechanism is based on the absorption of the energy of the particle which leads to the excitations of internal energy states (electrons, phonons). In a cryogenic particle detector the lifetime of these internal energy excitations are sufficiently long that they can be converted into a transient change in the electronic properties of a connected sensor (for more details see reference [Twe96a]).

"absorber": the part of a cryogenic particle detector which absorbs the energy of the molecule and in which internal energy excitations are created.

"sensor": the part of a cryogenic particle detector where the internal energy excitations are converted into an electronic transient signal.

"superconducting": the phase of condensed matter where the electrical resistance vanishes and in which magnetic fields are expelled.

"phase transition temperature": the critical temperature which determines the boundary between the superconducting phase and the normalconducting phase of a superconducting material: below the phase transition temperature the particular material is superconducting, above it is normalconducting.

"Cooper pairs": the ground state of the electrons in the superconducting phase characterized by the quantum mechanical correlation of pairs of electrons with a binding energy of the order of millielectronvolts.

"quasiparticles": the single particle excitations of electrons in the superconducting phase characterized by the fact that the lowest energy excitations of quasiparticles are separated from the ground state by an energy of half the binding energy of Cooper pairs.

"phonon": the quantized lattice vibrations of condensed matter. Cooper pairs are created by the interaction of electrons mediated by phonons. At temperatures below 100 milliKelvin the interaction between phonons and electrons becomes weak.

"superconducting tunneling junction": a device consisting of two metallic films separated by a thin insulating barrier of the order of a few nanometers whereby at least one of the metallic films is superconducting. Owing to the thinness of the insulating barrier, electrons can move between the films because of quantum mechanical tunneling.

"DC Josephson current": the quantum mechanical of Cooper pairs between the two superconducting films of a superconducting tunneling junction.

"hot electrons": electrons in a normalconducting film with energies larger than the thermally excited electrons.

"microcalorimeter": a cryogenic particle detector with a normalconducting film as an absorber where hot electrons are produced by the absorption of the molecule and where these hot electrons are converted into an electronic signal by either a superconducting tunneling junction or a transition edge sensor (see reference [Nah95]).

"transition edge sensor": a thermometer consisting of a superconducting film operated at a temperature which is in the center of the superconducting-to-normal phase transition. A transition edge sensor is characterized by a strong change of its resistance for small temperature changes (see reference [Irw95]).

"superconducting strip detector": a cryogenic particle detector which consists of a long and narrow strip of superconducting film which is operated at a temperature below the phase transition temperature and which is current biased. When absorbing the energy of a molecule, a region of the narrow strip becomes normal which induces a voltage drop which can be measured(see reference [You92]).

"ionizing detector": a molecule detector which consists of a resistive surface from which electrons are ejected on molecule impact. Through a series of dynodes further electrons are emitted creating a large and fast electron current. The quantum efficiency of an ionizing detector for ejecting an electron from the resistive surface decreases exponentially with decreasing molecule velocity.

The schematic of a quadrupol ion trap mass spectrometer with a cryogenic particle detector is shown in FIG. 1: in an evacuated receptacle (1) three sets of electrodes with hyperbolic surfaces are positioned such as to produce an electric quadrupole field. These electrodes are: a ring electrode (2) an upper end cap electrode (3) with a small hole (4) and a lower end cap electrode (5) with a small hole (6). The ring electrode (2) is connected to a radio frequency (RF) voltage supply (7) and the end cap electrodes (3) and (5) are either grounded or connected to a DC voltage supply (8). Molecules (10) are volatilized and ionized in an evacuated receptacle (9) and then injected through the hole (4) of end cap electrode (3) into the volume enclosed by the three electrodes (2), (3) and (5). The amplitudes and frequencies of the RF voltage applied to the ring electrode (2) are chosen such that the charged molecules move on closed trajectories (11) inside the receptacle (1). By introducing a low pressure gas (14), e.g. helium, from a container (13) into the evacuated receptacle (1), the trajectories (11) of the molecules are constricted to the center of the evacuated receptacle. (1) owing to the loss of energy due to diffusive scattering with the cooling gas (12). When applying the appropriate amplitude of the RF voltage of the ring electrode (2), and applying an appropriate RF frequency modulation, molecules (15) of a given mass to charge ratio are brought into a resonant state, leave the central region and can be extracted through the hole (6) of the end cap electrode (5) out of the evacuated receptacle (1). These extracted molecules (15) are collected in an evacuated receptacle (16), accelerated and focused by ion optical means leading to a molecular ion beam (17) which is directed onto a cryogenic particle detector (18) which is cooled by a low temperature cryostat (19) and connected via electrical leads (20) to an electronic amplifier system (21).

Figure 2:
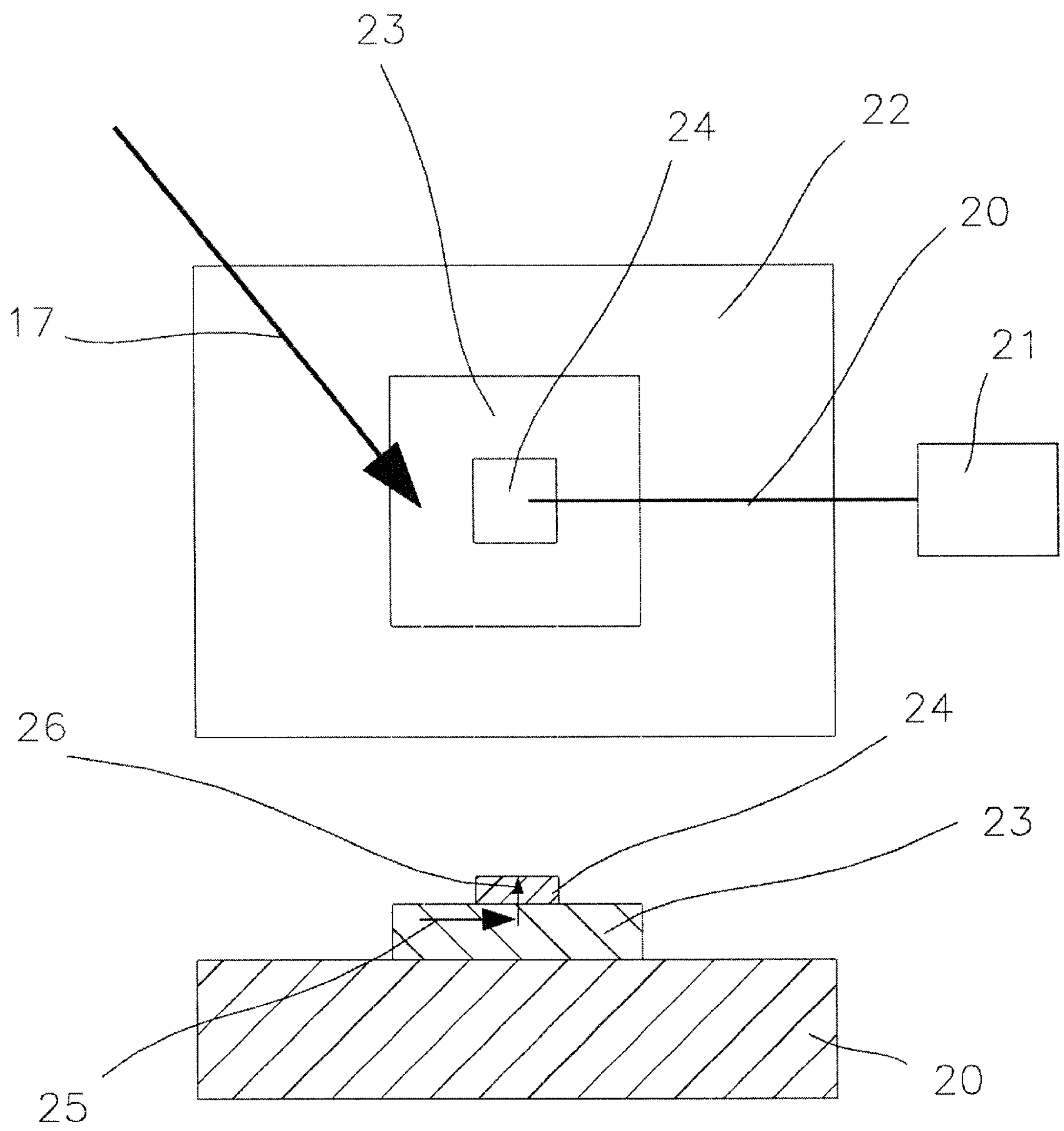
FIG. 2 is a schematic showing the principle of operation of a cryogenic particle detector.

In FIG. 2 the basic signal generating mechanism of a cryogenic particle detector is shown: the energetic molecule (17) hits an absorber (23) deposited on a substrate (22). The absorbed molecule energy excites internal energy states (25) in the absorber (23) which are of the order of millielectron-volt. These internal energy excitations can be both in form of phonon excitations, either thermal or non-thermal, depending on the embodiment of the cryogenic particle detector, or in form of electronic excitations. In the case of a superconducting film these electronic excitations are quasiparticles, or in the embodiment of a microcalorimeter, these electronic excitations are non-thermal hot electrons. Ultimately these excited internal energy states of the absorbing film will induce a transient change of electric current (26) which is collected in a sensor (24). A current lead (20) directs this excess electronic charge flow (26) to an electronic amplifier which generates a signal which can further be processed by signal and data processing schemes.

Figure 3:
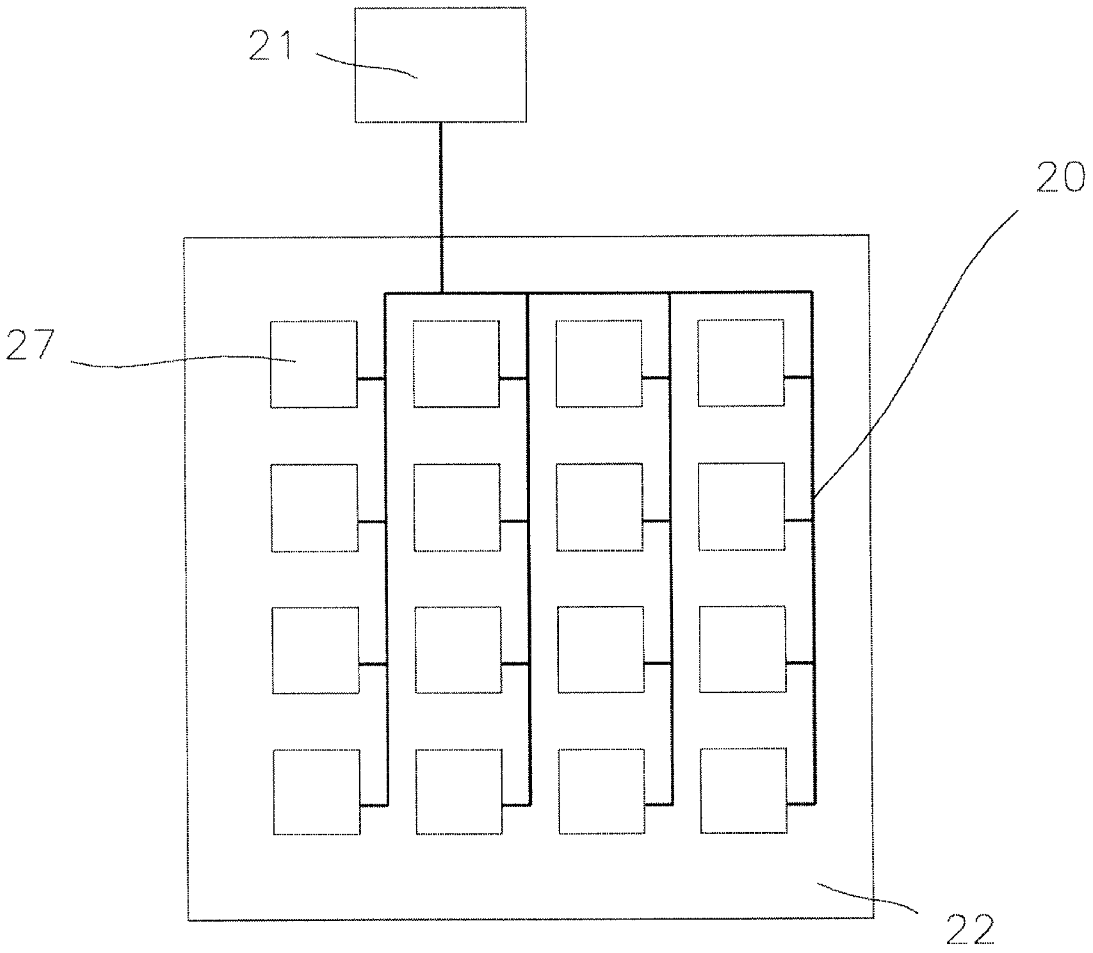
FIG. 3 is a schematic showing an embodiment of an array of cryogenic particle detector pixels.

FIG. 3 shows schematically an embodiment of an array of individual cryogenic particle detector pixels (27) deposited on a substrate (22) and connected via current leads (20) to a preamplifier system (21). This scheme allows the increase of the overall detector area and yields information about the spatial position of impact.

Figure 4:
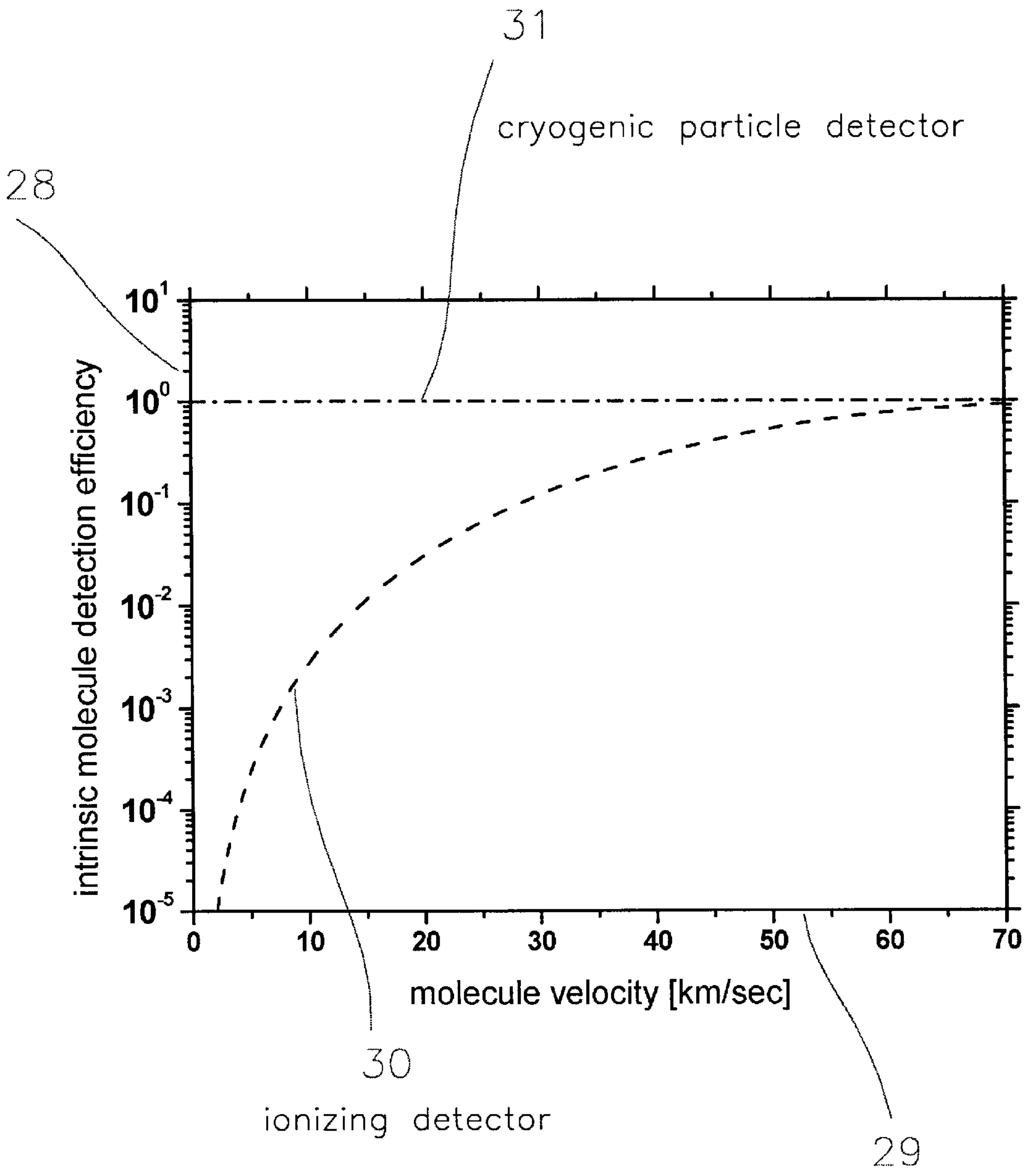
FIG. 4 is an experimentally determined curve showing the intrinsic detection efficiency of ionizing detectors as a function of molecule velocity and the intrinsic detection efficiency of a cryogenic particle detector which is independent of molecule velocity.

FIG. 4 shows the dependence of the intrinsic molecule detection efficiency on impact (28) as a function of molecule velocity (29) for the two detector types: the experimentally determined curve (30) is the intrinsic molecule detection efficiency on impact of ionizing detectors used in prior art quadrupol ion trap mass spectrometers and the curve (31) is the intrinsic molecule detection efficiency of cryogenic particle detectors used in this invention.

Figure 5:
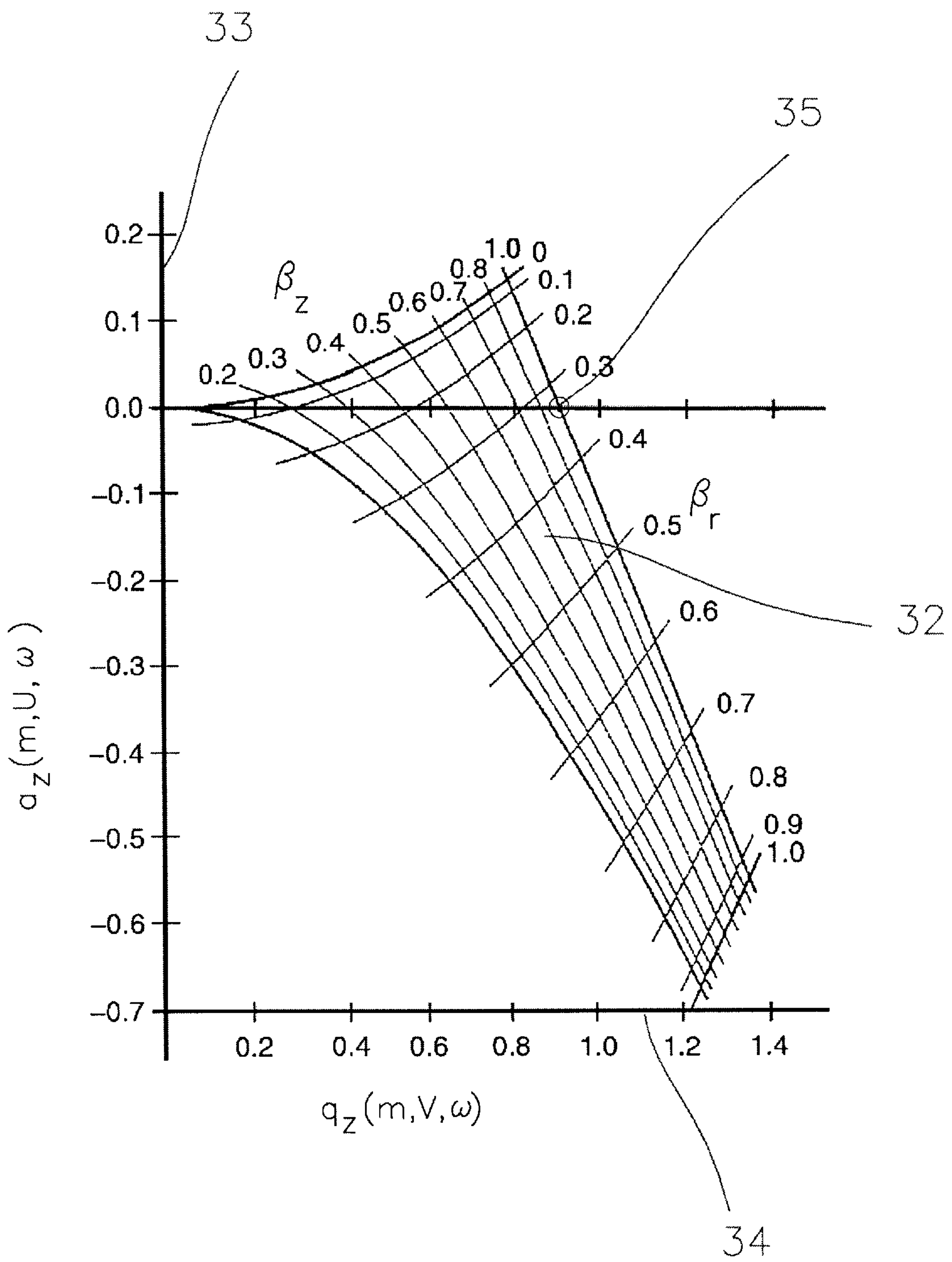
FIG. 5 is a theoretical curve showing the region of stability of molecules trapped in a quadrupol ion trap mass spectrometer.

FIG. 5 is a curve showing the region of stability (32) where molecules can be trapped in a quadrupol ion trap mass spectrometer in the plane of the parameter $a_z(m,U,\omega)$ (33) versus the parameter $q_z(m,V,\omega)$ (34), where (see reference [Mar00]):

$$a_z(m, U, \omega) = \frac{-8eU}{mr_0^2\omega^2} \text{ and } q_z(m, V, \omega) = \frac{4eV}{mr_0^2\omega^2}$$

are the dimensionless parameters in the Mathieu equation $$m\frac{d^2z}{dt^2} = -\frac{m\omega^2}{w}(a_z - 2q_z\cos\omega t)z$$

$$\text{for constant } \beta_z \approx \sqrt{\left(a_z + \frac{q_z^2}{2}\right)} \text{ and constant } \beta_r \approx \sqrt{\left(a_r + \frac{q_r^2}{2}\right)}$$

describing the trajectories of positive charged molecules with mass m in a quadrupol ion trap. U is the direct current voltage on the end cap electrodes (4) and (6), V is the amplitude of the RF voltage on the ring electrode (2), ω the angular frequency of the RF voltage on the ring electrode (2) and r0 is the distance from the center of the quadrupol ion trap to the ring electrode (2). For an ideal quadrupol field r0 and the distance z0 from the center of the quadrupol ion trap to the end cap electrode (4), respectively (6) is $r_0^2=2z_0^2$. Usually the direct current voltage U is zero and molecules with a mass-to-charge ratio leading to values qz of less than qz=0.908 are trapped. This value (35) determines the low mass cut off of the quadrupol ion trap mass spectrometer.

Figure 6:
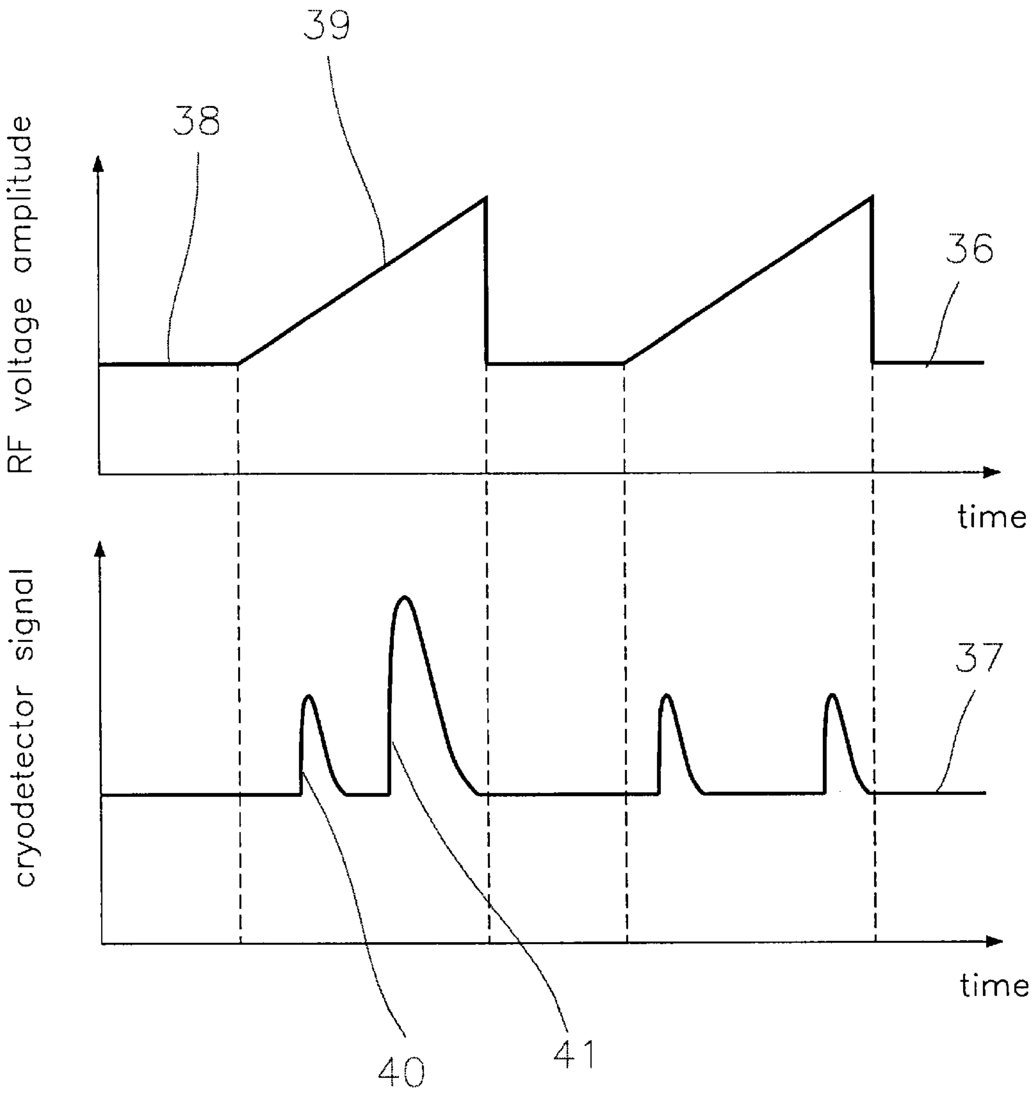
FIG. 6 is a schematic showing the mode of operation of a quadrupol ion trap mass spectrometer.

FIG. 6 is a schematic showing the mode of operation of a quadrupol ion trap mass spectrometer. The time curve (36) is the amplitude of the RF voltage on the ring electrode (2) and the time curve (37) the signal of the cryogenic particle detector. During the periods of constant RF voltage amplitudes (38) the molecules are injected and stored in the quadrupol ion trap mass spectrometer. When increasing the RF voltage amplitude (39), molecules of increasing mass-to-charge ratios will be ejected from the quadrupol ion trap mass spectrometer through the hole (6) of the lower end cap electrode (5) and accelerated and focused onto the cryogenic particle detector (18). This leads to cryogenic particle detector pulses (40) and (41) where the arrival time of the pulse is given by the mass-to-charge ratio of the ejected molecule, and the pulse height is proportional to the energy deposited by the molecule in the absorber of the cryogenic particle detector. The pulse (40) illustrates schematically the detection of a single charged molecule and pulse (41) the detection of a double charged molecule.

The invention is directed towards the implementation of cryogenic particle detectors in a quadrupole ion trap mass spectrometer. Cryogenic particle detectors have the unique property that their detection efficiency does not depend on the mass of the molecule, and hence massive molecules can be detected with much higher efficiency than with standard ionizing detectors used in prior art quadrupole ion trap mass spectrometers. When a molecule strikes the detecting resistive surface of a standard ionizing detector an electron is emitted. The quantum efficiency of an ionizing detector for ejecting an electron from the resistive surface decreases exponentially with decreasing molecule velocity. The comparison of molecule quantum detection efficiency between cryogenic particle detectors and standard ionizing detectors has been demonstrated experimentally (see reference [Twe01]) and is shown in FIG. 4.

When molecules are accelerated in an electro-optical apparatus, the kinetic energy of the molecules is proportional to the product of the molecule charge and the total electrostatic voltage difference applied to the molecule. This product is mass independent, hence all molecules leaving the acceleration region have the same energy. The velocity of a molecule, however, decreases inversely to the square root of the mass of the molecule. Because the detection efficiency of ionizing detectors decreases exponentially with decreasing velocity, the detection efficiency of ionizing detectors decreases exponentially with increasing mass. For cryogenic particle detectors the molecule detection efficiency is independent of mass because the detection mechanism of cryogenic particle detectors is based on the absorption of the energy of the molecule. As has been pointed out above, the energy of molecules is independent of mass when leaving an electro-optical apparatus for accelerating molecules.

A quadrupol ion trap mass spectrometer requires a molecule detector for determining the time when a molecule is ejected from the quadrupol ion trap during the RF amplitude ramp-up phase (see FIG. 6). Molecules with larger mass-to-charge ratios arrive at the detector at a later time. In order to detect the ejected molecules, the molecules have to be accelerated. Therefore, in prior art quadrupol ion trap mass spectrometers using ionizing detectors the sensitivity for molecules with large masses decreases exponentially with increasing mass. This invention solves this sensitivity problem for large masses by using cryogenic particle detectors. In addition, because cryogenic particle detectors have energy thresholds below 1 kiloelectronvolt, much smaller acceleration voltages can be used in the electro-optical apparatus following the ejection of the molecules.

REFERENCES

[Ben97] Benner, W. H., et al., J. Am. Soc. Mass. Spectrom., 8 (1997), 1094.
[Fra96] Frank, M., et al., Rapid Comm. in Mass Spectrom., 10 (1996), 1946.
[Hil98] Hilton, G. H., et al., Nature, 391, (1998) 672.
[Irw95] Irwin, K., Appl. Phys. Lett., 66 (1995) 1998.
[Lin61] Linhard, J., et al., Phys.Rev. 124 (1961) 128.
[Mar00] March, R. E., "Quadrupolen Ion Trap Mass Spectrometer" in Encyclopedia of Analytical Chemistry, R.A.Meyers (Ed.), pp 11848–11872, John Wiley & Sons Ltd., Chichesterm 2000
[Nah95] Nahum, M., et al., Appl.Phys.Lett., 66 (1995) 3203.
[Sch99] Schlunegger, U. P. et al., Rapid Commun. Mass Spectrom. 13 (1999) 1792–1796.
[Twe96a] Twerenbold, D., Rep. Progr. Phys., 59 (1996) 349.
[Twe96b] Twerenbold, D., Nucl.lnstr.and.Meth., A370 (1996) 253.
[Twe96c] Twerenbold, D., et al., Appl. Phys. Lett., 68 (1996) 3503.
[Twe01] Twerenbold, D., et al., Proteomics, 1 (2001), 66.
[Twe02] Twerenbold, D., et al., Proteomics, 2 (2002), 436.
[You92] Young, B. A., et al., Nucl.lnstr.and.Meth., A311 (1992) 195.
U.S. Pat. No. 2,939,952 June 1960Paul et al.
U.S. Pat. No. 4,540,884 September 1985Stafford et al.
U.S. Pat. No. 5,075,547 December 1991Johnson et al.
U.S. Pat. No. 5,170,054 December 1992Franzen et al.
U.S. Pat. No. 5,640,010 June 1997Twerenbold
U.S. Pat. No. 5,994,694 November 1999Frank et al.

What is claimed is:

1. A quadrupol ion trap mass spectrometer comprising:

an apparatus for volatilizing and charging molecules out of a mixture;

an electro-optical injection apparatus in which the volatilized and charge molecules are accelerated and injected into an evacuated quadrupole ion trap receptacle;

the evacuated quadrupole ion trap receptacle containing a ring electrode, an upper end cap electrode and a lower end cap electrode;

the three electrodes placed in the evacuated quadrupole ion trap receptacle such that they create an electric quadrupole field in the central region of the evacuated quadrupole ion trap receptacle;

the upper end cap electrode having a hole for permitting the entry of the accelerated molecules produced in the volatilizing and charging apparatus and injected from the electro-optical injection apparatus;

the lower end cap electrode having a hole for permitting the exit of molecules;

a radio frequency alternating current voltage supply connected to the ring electrode operated such that the injected molecules are trapped in the evacuated quadrupole ion trap receptacle;

a buffer gas introduced into the evacuated quadrupole ion trap receptacle for cooling the trapped molecules;

increasing the amplitude of the radio frequency alternating current voltage on the ring electrode such that the trapped molecules are ejected out of the exit hole of the lower end cap electrode in order of increasing mass-to-charge ratio;

an apparatus for accelerating and focusing the ejected molecules; and a cryogenic particle detector comprising at least one absorber and at least one sensor for determining the time of impact of the molecules ejected from the exit hole of the lower end cap electrode.

2. The quadrupol ion trap mass spectrometer according to claim 1, wherein the absorber and the sensor of the cryogenic particle detector are identical.

3. The quadrupol ion trap mass spectrometer according to claim 1, wherein the cryogenic particle detector is a superconducting tunneling junction consisting of two superconducting films separated by a thin oxide barrier; whereby a magnet field is applied parallel to the superconducting tunneling junctions in order to suppress the DC Josephson current; whereby the absorbed molecule energy breaks Cooper pairs in the superconducting films of the superconducting tunneling junction and produces excess quasiparticles; whereby the excess quasiparticles tunnel through the insulating barrier of the superconducting tunneling junction and produce an excess quasiparticle current which produces an electronic signal which determines the time of impact of the molecule and the energy deposited by the molecule.

4. The quadrupol ion trap mass spectrometer according to claim 3, wherein the superconducting tunnel junction consists of a large area superconducting absorber film covered with a small area superconducting film with a smaller superconducting gap and an oxide barrier on top of the small area superconducting film; a top film covers the oxide barrier; whereby the absorbed molecule energy first produces excess quasiparticles in the large area superconducting film which diffuses into the small area superconducting film where the excess quasiparticles are trapped and tunnel through the oxide barrier into the top film.

5. The quadrupol ion trap mass spectrometer according to claim 4, wherein the top film is superconducting.

6. The quadrupol ion trap mass spectrometer according to claim 4, wherein the top film is normalconducting; whereby no magnetic field is required to suppress the DC Josephson current.

7. The quadrupol ion trap mass spectrometer according to claim 3, wherein at least one of the superconducting films is comprised of tantalum.

8. The quadrupol ion trap mass spectrometer according to claim 3, wherein at least one of the superconducting films is comprised of niobium or an alloy of niobium.

9. The quadrupol ion trap mass spectrometer according to claim 3, wherein at least one of the superconducting films is comprised of aluminum.

10. The quadrupol ion trap mass spectrometer according to claim 4, wherein at least one of the superconducting films is comprised of tantalum.

11. The quadrupol ion trap mass spectrometer according to claim 4, wherein at least one of the superconducting films is comprised of niobium or an alloy of niobium.

12. The quadrupol ion trap mass spectrometer according to claim 4, wherein at least one of the superconducting films is comprised of aluminum.

13. The quadrupol ion trap mass spectrometer according to claim 5, wherein at least one of the superconducting films is comprised of tantalum.

14. The quadrupol ion trap mass spectrometer according to claim 5, wherein at least one of the superconducting films is comprised of niobium or an alloy of niobium.

15. The quadrupol ion trap mass spectrometer according to claim 5, wherein at least one of the superconducting films is comprised of aluminum.

16. The quadrupol ion trap mass spectrometer according to claim 6, wherein the normalconducting film is comprised of silver.

17. The quadrupol ion trap mass spectrometer according to claim 6, wherein the normalconducting film is comprised of gold.

18. The quadrupol ion trap mass spectrometer according to claim 1, wherein the cryogenic particle detector is a microcalorimeter consisting of a normalconducting film as an absorber; whereby the absorbed molecule energy creates hot electrons which do not interact with the thermal phonons in the absorber; whereby the energetically excited electrons are measured by a sensor; whereby an electronic signal is produced which determines the time of impact of the molecule and the energy deposited by the molecule.

19. The quadrupol ion trap mass spectrometer according to claim 18, wherein the normalconducting absorber film is comprised of silver.

20. The quadrupol ion trap mass spectrometer according to claim 18, wherein the normalconducting absorber film is comprised of bismuth.

21. The quadrupol ion trap mass spectrometer according to claim 18, wherein the normalconducting absorber film is comprised of gold.

22. The quadrupol ion trap mass spectrometer according to claim 18, wherein the sensor is a normalconducting-insulator-superconducting tunneling junction; whereby the absorber of the microcalorimeter is the normalconducting film of the normalconducting-insulator-superconducting tunneling junction; whereby the hot electrons tunnel from the normalconducting absorber through the insulating barrier into the superconducting film; whereby an electronic signal is produced which determines the time of impact of the molecule and the energy deposited by the molecule.

23. The quadrupol ion trap mass spectrometer according to claim 22, wherein the superconducting films is comprised of aluminum.

24. The quadrupol ion trap mass spectrometer according to claim 18, wherein the sensor is a transition edge sensor deposited on the normalconducting absorber of the microcalorimeter; whereby the hot electrons diffusing into the transition edge sensor increase the temperature of the transition edge sensor which changes the required bias current of the transition edge sensor for stabilizing the applied voltage across the transition edge sensor; whereby an electronic signal is produced which determines the time of impact of the molecule and the energy deposited by the molecule.

25. The quadrupol ion trap mass spectrometer according to claim 24, wherein the transition edge sensor is a superconducting/normalconducting bilayer.

26. The quadrupol ion trap mass spectrometer according to claim 25, wherein the superconducting film of the bilayer is comprised of molybdenum.

27. The quadrupol ion trap mass spectrometer according to claim 25, wherein the superconducting film of the bilayer is comprised of iridium.

28. The quadrupol ion trap mass spectrometer according to claim 25, wherein the superconducting film of the bilayer is comprised of tungsten.

29. The quadrupol ion trap mass spectrometer according to claim 25, wherein the superconducting film of the bilayer is comprised of aluminum.

30. The quadrupol ion trap mass spectrometer according to claim 25, wherein the superconducting film of the bilayer is comprised of tantalum.

31. The quadrupol ion trap mass spectrometer according to claim 25, wherein the normalconducting film of the bilayer is comprised of gold.

32. The quadrupol ion trap mass spectrometer according to claim 25, wherein the normalconducting film of the bilayer is comprised of copper.

33. The quadrupol ion trap mass spectrometer according to claim 25, wherein the normalconducting film of the bilayer is comprised of silver.

34. The quadrupol ion trap mass spectrometer according to claim 1 wherein the cryogenic particle detector is a superconducting strip detector; whereby the absorbed molecule energy heats the current biased superconducting strip at the position of impact to a temperature higher than its normalconducting-to-superconducting phase transition temperature which induces a transient voltage drop; whereby an electronic signal is produced which determines the time of impact of the molecule and the energy deposited by the molecule.

35. The quadrupol ion trap mass spectrometer according to claim 34, wherein the material of the superconducting strip detector is comprised of aluminum.

36. The quadrupol ion trap mass spectrometer according to claim 34, wherein the material of the superconducting strip detector is comprised of titanium.

37. The quadrupol ion trap mass spectrometer according to claim 34, wherein the material of the superconducting strip detector is comprised of molybdenum.

38. The quadrupol ion trap mass spectrometer according to claim 34, wherein the superconducting strip detector is a superconducting/normalconducting bilayer.

39. The quadrupol ion trap mass spectrometer according to claim 38, wherein the superconducting film of the bilayer is comprised of molybdenum.

40. The quadrupol ion trap mass spectrometer according to claim 38, wherein the superconducting film of the bilayer is comprised of iridium.

41. The quadrupol ion trap mass spectrometer according to claim 38, wherein the superconducting film of the bilayer is comprised of tungsten.

42. The quadrupol ion trap mass spectrometer according to claim 38, wherein the superconducting film of the bilayer is comprised of aluminum.

43. The quadrupol ion trap mass spectrometer according to claim 38, wherein the superconducting film of the bilayer is comprised of tantalum.

44. The quadrupol ion trap mass spectrometer according to claim 38, wherein the normalconducting film of the bilayer is comprised of gold.

45. The quadrupol ion trap mass spectrometer according to claim 38, wherein the normalconducting film of the bilayer is comprised of copper.

46. The quadrupol ion trap mass spectrometer according to claim 38, wherein the normalconducting film of the bilayer is comprised of silver.

47. The quadrupol ion trap mass spectrometer according to claim 1, wherein the cryogenic particle detector consists of an array of individual cryogenic particle detector pixels.

48. The quadrupol ion trap mass spectrometer according to claim 1, wherein the entry hole and the exit hole of the end cap electrode are identical.

49. The quadrupol ion trap mass spectrometer according to claim 1, wherein there are more than one exit holes.

50. The quadrupol ion trap mass spectrometer according to claim 1, wherein the mixture is a liquid solution.

51. The quadrupol ion trap mass spectrometer according to claim 1, wherein the mixture is solid.

52. The quadrupol ion trap mass spectrometer according to claim 50, wherein the mixture consists of solid MALDI matrix crystals.

53. The quadrupol ion trap mass spectrometer according to claim 1, wherein the buffer gas is helium.

54. The quadrupol ion trap mass spectrometer according to claim 1, wherein the apparatus for volatilizing and charging molecules is based on the Matrix-Assisted Laser Desorption/Ionization (MALDI) technique.

55. The quadrupol ion trap mass spectrometer according to claim 1, wherein the apparatus for volatilizing and charging molecules is based on the Electron Spray Ionization (ESI) technique.

56. The quadrupol ion trap mass spectrometer according to claim 1, wherein the apparatus for volatilizing and charging molecules is based on the Fast Atom Bombardment (FAB) technique.

57. The quadrupol ion trap mass spectrometer according to claim 1, wherein the apparatus for volatilizing and charging molecules is coupled to a liquid chromatograph.

58. The quadrupol ion trap mass spectrometer according to claim 1, wherein a gas is introduced for fragmenting the molecules and analyzing the mass to charge distribution of the fragments.

59. The quadrupol ion trap mass spectrometer according to claim 1, wherein the molecules are proteins and protein fragments.

60. The quadrupol ion trap mass spectrometer according to claim 1, wherein the molecules are DNA and DNA fragments.

61. The quadrupol ion trap mass spectrometer according to claim 1, wherein the molecules are synthetic polymers and synthetic polymers fragments.

* * * * *